US010590255B2

(12) United States Patent
Choi et al.

(10) Patent No.: US 10,590,255 B2
(45) Date of Patent: Mar. 17, 2020

(54) VINYL ACETATE-ETHYLENE COPOLYMER EMULSION AND METHOD FOR PRODUCING SAME

(71) Applicant: Wacker Chemie AG, Munich (DE)

(72) Inventors: Yong Hae Choi, Gyeonggi-do (KR); Jong Bok Kim, Busan (KR)

(73) Assignee: Wacker Chemicals Korea Inc., Gyeonggi-Do (KR)

( * ) Notice: Subject to any disclaimer, the term of this patent is extended or adjusted under 35 U.S.C. 154(b) by 199 days.

(21) Appl. No.: 15/742,315

(22) PCT Filed: Jul. 4, 2016

(86) PCT No.: PCT/KR2016/007179
§ 371 (c)(1),
(2) Date: Jan. 5, 2018

(87) PCT Pub. No.: WO2017/007199
PCT Pub. Date: Jan. 12, 2017

(65) Prior Publication Data
US 2018/0194921 A1    Jul. 12, 2018

(30) Foreign Application Priority Data
Jul. 6, 2015   (KR) .................. 10-2015-0096124

(51) Int. Cl.
| | |
|---|---|
| C08K 3/24 | (2006.01) |
| C08K 5/47 | (2006.01) |
| C08K 5/20 | (2006.01) |
| C08L 23/08 | (2006.01) |
| C08J 3/05 | (2006.01) |
| C08K 3/00 | (2018.01) |
| C08J 3/03 | (2006.01) |
| C08F 218/08 | (2006.01) |
| C08F 2/24 | (2006.01) |
| C08F 210/02 | (2006.01) |
| C08K 5/00 | (2006.01) |
| C08K 3/16 | (2006.01) |
| C01B 11/22 | (2006.01) |

(52) U.S. Cl.
CPC .................. *C08K 3/24* (2013.01); *C08F 2/24* (2013.01); *C08F 210/02* (2013.01); *C08F 218/08* (2013.01); *C08J 3/03* (2013.01); *C08J 3/05* (2013.01); *C08K 3/00* (2013.01); *C08K 3/16* (2013.01); *C08K 5/00* (2013.01); *C08K 5/20* (2013.01); *C08K 5/47* (2013.01); *C08L 23/0853* (2013.01); *C01B 11/22* (2013.01)

(58) Field of Classification Search
CPC ... C08K 3/24; C08K 3/16; C08K 5/47; C08K 5/20; C08L 23/08; C08J 3/05
USPC ........................................................ 524/401
See application file for complete search history.

(56) References Cited

U.S. PATENT DOCUMENTS

| | | |
|---|---|---|
| 6,635,725 B1 | 10/2003 | Sata |
| 2002/0099113 A1 | 7/2002 | Rabasco et al. |
| 2008/0242794 A1 | 10/2008 | Sandford et al. |
| 2008/0280792 A1 | 11/2008 | Williams |

FOREIGN PATENT DOCUMENTS

| | | |
|---|---|---|
| JP | 2003171407 A | 6/2003 |
| JP | 2003277411 A | 10/2003 |
| KR | 20010050695 A | 6/2001 |
| KR | 20020020208 A | 3/2002 |
| KR | 100967591 B1 | 7/2010 |

OTHER PUBLICATIONS

International Search Report and Written Opinion for International Application No. PCT/KR2016/007179, dated Oct. 10, 2016—9 Pages.
English Translation of IPER.
Supplementary European Search Report for Application No. EP 16 82 1605 dated Jul. 6, 2018, 3 pages.

*Primary Examiner* — Deve V Hall
(74) *Attorney, Agent, or Firm* — RatnerPrestia

(57) ABSTRACT

The present invention relates to a method for producing a vinyl acetate-ethylene copolymer emulsion which has high preparation stability and compatibility between raw materials, has a small amount of residual monomers, and is capable of improving the durability of a preservative and product stability; and a vinyl acetate-ethylene copolymer emulsion which has excellent durability of preservative and product stability.

12 Claims, No Drawings

VINYL ACETATE-ETHYLENE COPOLYMER EMULSION AND METHOD FOR PRODUCING SAME

CROSS-REFERENCE TO RELATED APPLICATIONS

This application is a U.S. National Phase Application of PCT International Application PCT/KR2016/007179, filed Jul. 4, 2016, which claims priority benefit of Korean Application KR 10-2015-0096124, filed Jul. 6, 2015, the disclosures of which are incorporated herein in their entirety.

FIELD OF THE INVENTION

The present invention relates to a method for producing a vinyl acetate-ethylene copolymer emulsion which has high production stability and compatibility between raw materials, has a small amount of residual monomers, and is capable of improving the durability of a preservative and product stability; and a vinyl acetate-ethylene copolymer emulsion which has excellent durability of the preservative and product stability.

BACKGROUND

A vinyl acetate-ethylene copolymer emulsion (hereinafter, referred to as a 'VAE emulsion') has been widely used in the overall industries, such as for use in paint binder, wood adhesion, carpet back coating, non-woven fabric, construction (waterproof agent, adhesion promoter, and primer), and paper coating.

When the VAE emulsion is produced, various types of initiators (for example, redox types/thermal decomposition) are used, and various additives including a cationic inorganic pigment such as calcium carbonate, carbon black, clay, titanium dioxide, cement, and silica sand, or an organic additive such as a thickener, a plasticizer, and a dispersant are added according to the use thereof. Aggregates occur due to extra initiators or the compatibility problem between residual monomers and various additives in the VAE emulsion. Problem such as abnormal physical properties or a change in viscosity may also occur. The problems result in the deterioration of stability of the VAE emulsion. Further, the VAE emulsion is often used in a mixture with other aqueous emulsions, and in this case, there sometimes occurs a problem with the mixture stability with other emulsions.

Furthermore, since reactions proceed in water during the production of a VAE emulsion, and a final product also contains a large amount of water, the VAE emulsion is exposed to danger of decay. Accordingly, the VAE emulsion generally includes a preservative. Examples of the preservative include 5-chloro-2-methyl-4-isothiazolin-3-one (hereinafter, referred to as 'CMIT'), 2-methyl-4-isothiazolin-3-one (hereinafter, referred to as 'MIT'), and 1,2-benzisothiazolin-3-one (hereinafter, referred to as 'BIT'). However, the preservative is destroyed owing to residual initiators in the VAE emulsion in the art, the pH of a product, the storage temperature, and oxidation-reduction potentials. As a result, the storage stability of a VAE emulsion product is also affected.

In this connection, Korean Patent No. 10-0967591 discloses a composition including 3-isothiazolone and an iodine-containing stabilizer. However, the document does not disclose that the composition is used for the polymerization of a vinyl acetate-ethylene copolymer.

SUMMARY OF THE INVENTION

An object of the present invention is to provide a method for producing a vinyl acetate-ethylene copolymer emulsion which has high production stability and compatibility between raw materials, has a small amount of residual monomers, is capable of adjusting the oxidation-reduction potentials and is capable of improving the preservative effect of a product and product stability.

Further, another object of the present invention is to provide a vinyl acetate-ethylene copolymer emulsion which has high product stability and yield.

The present invention provides a method for producing a vinyl acetate-ethylene copolymer emulsion, the method including:

(S100) forming a first mixed solution containing a vinyl acetate-ethylene copolymer, including polymerizing vinyl acetate and ethylene;

(S200) forming a second mixed solution by adding potassium iodate ($KIO_3$) to the first mixed solution; and (S300) adding an isothiazolone-based compound to the second mixed solution.

According to an exemplary embodiment of the present invention, in step S200, potassium iodate ($KIO_3$) is added preferably after 30 minutes to 2 hours, and more preferably after 45 minutes to 1 hour and 30 minutes from the formation of the first mixed solution in step S100.

Further, in step S200, $KIO_3$ is added in an amount of preferably 10 to 200 ppm, and more preferably 50 to 150 ppm, based on a total amount of the first mixed solution.

In step S300, the isothiazolone-based compound is added in an amount of 10 to 150 ppm, and more preferably 30 to 120 ppm, based on a total amount of the vinyl acetate-ethylene copolymer emulsion.

Further, according to an exemplary embodiment, step S100 includes: (S110) mixing a first solution including water, a first emulsifier, and a pH adjusting agent with a second solution including water and an oxidation auxiliary agent: (S120) introducing vinyl acetate and ethylene into the mixture obtained in step S110 under a nitrogen atmosphere; (S130) introducing a first reducing agent into a product obtained in step S120, and then warming the resulting mixture to 45° C. to 65° C.; (S140) introducing an oxidation-reduction initiator, vinyl acetate, and a third solution including water, a NaOH solution, a functional monomer, and a second emulsifier into a product obtained in step S130; and (S150) completing a polymerization, and then simultaneously introducing an oxidizing agent and a second reducing agent into a reactor.

According to another exemplary embodiment, step S100 includes: (S101) preparing a first solution including water, a first emulsifier, and a pH adjusting agent; (S102) introducing vinyl acetate and ethylene into the first solution under a nitrogen atmosphere; (S103) introducing a first reducing agent into a product obtained in step S102, and then warming the resulting mixture to 45° C. to 65° C.; (S104) introducing a thermal initiator; vinyl acetate; and a third solution including water, NaOH, a functional monomer, and a second emulsifier into a product obtained in step S103; and (S105) completing a polymerization, and then simultaneously introducing an oxidizing agent and a second reducing agent.

Here, it is preferred that the first emulsifier is a sulfonate group-containing emulsifier, and the oxidation-reduction initiator includes (a) one or more reduction initiators selected from the group consisting of a transition metal salt, and erythorbic acid, ascorbic acid, and an alkali metal salt thereof and (b) one or more oxidation initiators selected from the group consisting of hydrogen peroxide, tri-butyl hydroperoxide, tert-butyl hydroperoxide, cumyl hydroperoxide, and benzoyl peroxide.

Furthermore, the present invention provides a vinyl acetate-ethylene copolymer emulsion including: a vinyl acetate-ethylene copolymer, an isothiazolone-based compound, and potassium iodate ($KIO_3$).

The vinyl acetate-ethylene copolymer emulsion may further include one or more additives selected from the group consisting of an antifoaming agent, a cationic inorganic pigment, a thickener, a plasticizer, and a dispersant.

Since the present invention may improve the product stability and compatibility among raw materials, may decrease residual monomers, and may improve the holding force of a preservative by adding $KIO_3$ at a particular time point when a vinyl acetate-ethylene copolymer emulsion is produced, a vinyl acetate-ethylene copolymer emulsion (VAE emulsion) having excellent stability may be produced.

DETAILED DESCRIPTION OF THE INVENTION

Hereinafter, the present invention will be described.

The present invention is characterized by adding potassium iodate ($KIO_3$) at a particular time point in producing the vinyl acetate-ethylene copolymer emulsion to improve the stability of a vinyl acetate-ethylene copolymer emulsion (VAE emulsion).

Since the VAE emulsion in the art contains water, it is exposed to danger of decay. Thus, the VAE emulsion includes a preservative in order to solve such problem. However, since oxidation-reduction agents are used under various conditions during the production of the VAE emulsion, it is difficult to find an effective preservative system. In addition, an isothiazolone-based compound conventionally used as a preservative of the VAE emulsion is decomposed owing to residual initiators in the emulsion, and the pH of the emulsion, and as a result, the stability of a final VAE emulsion is also affected.

Thus, the present inventors have found that when potassium iodate ($KIO_3$) is added to a VAE emulsion including an isothiazolone-based compound as a preservative conventionally in the used art, the $KIO_3$ may render the concentration of the isothiazolone-based compound maintained, the compatibility of various additives in the emulsion improved, the oxidation-reduction potential of the emulsion controlled within a range of 0 to 300 mV, and the residual initiator and the residual monomer removed.

Further, surprisingly, the present inventors have found that the degree of removing (oxidizing) the residual initiator varies depending on the time point of adding the $KIO_3$ during the production of the VAE emulsion, which affects the holding force of the isothiazolone-based compound and the removal of the residual monomer (see the following Table 1).

Therefore, according to the present invention, $KIO_3$ is added to a solution containing a vinyl acetate-ethylene copolymer after about 0.5 to 2 hours from a completion of a polymerization of the vinyl acetate-ethylene copolymer (preferably, after removal of unreacted monomers), before adding an isothiazolone-based compound. As a result, the residual monomer may be effectual oxidized, the polymerization of the residual monomer is promoted to effectively reduce the remaining amount of the residual monomer, particularly, vinyl acetate, and the decomposition of the isothiazolone-based compound may be effectively prevented. Further, the present invention may produce the VAE emulsion at a yield of about 0.1 to 0.3% higher than the conventional method, in which $KIO_3$ is not added.

The method for producing a vinyl acetate-ethylene copolymer emulsion according to an exemplary embodiment of the present invention includes: (S100) forming a first mixed solution containing a vinyl acetate-ethylene copolymer, including polymerizing vinyl acetate and ethylene; (S200) forming a second mixed solution by adding potassium iodate ($KIO_3$) to the first mixed solution; and (S300) adding an isothiazolone-based compound to the second mixed solution.

Hereinafter, each step of the method will be described.

(S100) Formation of First Mixed Solution Containing Vinyl Acetate-Ethylene Copolymer A first mixed solution including a vinyl acetate-ethylene copolymer is formed (hereinafter, referred to as 'step S100').

According to a first exemplary embodiment of the present invention, step S100 includes: (S110) mixing a first solution including water, a first emulsifier, and a pH adjusting agent with a second solution including water and an oxidation auxiliary agent; (S120) introducing vinyl acetate and ethylene into the mixture obtained in step S110 under a nitrogen atmosphere; (S130) introducing a first reducing agent into a product obtained in step S120, and then warming the resulting mixture to 45° C. to 65° C.; (S140) introducing an oxidation-reduction initiator, vinyl acetate, and a third solution including water, a NaOH solution, a functional monomer, and a second emulsifier into a product obtained in step S130; and (S150) completing a polymerization, and then simultaneously introducing an oxidizing agent and a second reducing agent into a reactor, but step S100 is not limited thereto.

First, the first solution and the second solution, respectively are prepared (hereinafter, referred to 'step S110').

The first solution is formed by uniformly mixing water, a first emulsifier, and a pH adjusting agent.

As the first emulsifier, any emulsifier generally used in the art in the production of a VAE emulsion may be used without any particular limitation. However, when a sulfonate group-containing emulsifier is used as the first emulsifier, the residual first emulsifier may be oxidized by $KIO_3$ at a later time, and as a result, the isothiazolone-based compound in the final VAE emulsion may be stably maintained.

Examples of the sulfonate group-containing emulsifier include sodium sulfosuccinate alkyl glycol, sodium dodecylbenzene sulfonate, sodium polyoxyethylene alkyl aryl sulfonate, ammonium polyoxyethylene alkyl sulfate, and polyoxyethylene alkylphenylether ammonium sulfate, but are not limited thereto.

The content of the first emulsifier is not particularly limited, but for example, in the case of sodium sulfosuccinate propylene glycol, the content thereof may be 0.1 to 10 wt % based on 100 parts by weight of vinyl acetate.

A pH adjusting agent available in the present invention is not particularly limited as long as the pH adjusting agent is usually used in the production of the VAE emulsion in the art. Examples thereof include sodium acetate, and acetic acid. The pH adjusting agent may be used alone or in a combination of two or more. For example, a mixture of sodium acetate and acetic acid are used as the pH adjusting agent. The content of the pH adjusting agent is adjusted according to the pH of the first solution, to control the pH of the solution within a range about 4 to about 5.

The content of water in the first solution is not particularly limited, and for example, may be about 80 times to about 130 times as compared to the amount of the first emulsifier used.

The time for mixing the materials is not particularly limited, but when the time is within a range of about 10 minutes to about 30 minutes, preferably 15 minutes to 25 minutes, water, the first emulsifier, and the pH adjusting agent may be more uniformly mixed.

It is preferred to adjust the pH of the first solution to about 4 to about 5 in order to accelerate production of radicals, thereby improving the reaction rate. Accordingly, the content of the pH adjusting agent may be increased or decreased according to the pH of the first solution.

Further, the second solution is formed by uniformly mixing water and an oxidation auxiliary agent. In this case, the oxidation auxiliary agent serves to promote production of radicals. It is preferred that the oxidation auxiliary agent is completely dissolved in water. Non-limiting examples of the auxiliary agent include ferrous ammonium sulfate.

The content of the oxidation auxiliary agent is not particularly limited, but may be 0.0001 to 0.05 part by weight based on 100 parts by weight of vinyl acetate.

The content of water in the second solution is not particularly limited, and may be 10 times to 20 times as compared to the amount of the oxidation auxiliary agent used.

Hereinafter, the first solution and the second solution are mixed, and then are introduced into a reactor. In this case, the mixing time of the first solution and the second solution is preferably about 5 minutes to about 15 minutes.

A reactor available in the present invention is a pressurized reactor, and may be used without particular limitation as long as the reactor is a pressurized reactor with an internal pressure of about 0 kgf/cm$^2$ to about 80 kgf/cm$^2$ among the pressurized reactors known in the art. In this case, a material for the pressurized reactor is not particularly limited as long as it may withstand an internal pressure of up to 80 kgf/cm$^2$.

Subsequently, vinyl acetate and ethylene are introduced into the mixture obtained in step S110 under a nitrogen atmosphere (hereinafter, referred to as 'step S120').

The ratio of vinyl acetate to ethylene used may be a weight ratio of 5:95 to 95:5, preferably a weight ratio of 10:90 to 60:40.

Further, in the present invention, in addition to vinyl acetate and ethylene, any monomer may be used without particular limitation as long as the monomer may be copolymerized with vinyl acetate and ethylene. Non-limiting examples thereof include: vinyl esters such as vinyl propionate, vinyl butyrate, vinyl pivalate, vinyl laurate, vinyl isononanoate, and vinyl versatate; halogenated vinyls such as vinyl chloride and vinyl bromide; (meth)acrylates such as 2-ethylhexyl (meth)acrylate, n-butyl (meth)acrylate, ethyl (meth)acrylate and methyl (meth)acrylate; maleates, crotonates, and itaconates. These compounds may be used alone or in a combination of two or more. In addition, it is also possible to use monomers containing (meth)acrylic acid, crotonic acid, maleic acid, itaconic acid, acrylamide, N-methyolacrylamide, N-butoxymethylacrylamide, 2-hydroxyethyl methacrylate, glycidyl methacrylate, allyl sulfonate, vinyl sulfonate, triallyl cyanurate, triallyl isocyanurate, diallyl phthalate and a salt thereof.

The content of the copolymerizable monomer is not particularly limited, but the monomer may be used in a weight of about 0.1 time to about 10 times as compared to the amount of vinyl acetate monomer used.

The mixing time of the vinyl acetate and ethylene is not particularly limited, but when the time is within a range of about 10 minutes to 30 minutes, preferably about 15 minutes to about 25 minutes, the yield of the polymerization reaction may be improved.

Thereafter, a first reducing agent is introduced into a product obtained in step S120, and then the resulting mixture is warmed to about 45° C. to about 65° C. (hereinafter, referred to as 'step S130').

Any reducing agent usually used in the production of a VAE emulsion in the art may be used as the first reducing agent without particular limitation. Examples thereof include sodium erythorborate, sodium formaldehyde sulfoxylate, and sodium hydrosulfite, but are not limited thereto.

The content of the reducing agent is not particularly limited, but for example, when the reducing agent is sodium erythorborate, the content may be 0.001 to 1.0 part by weight based on 100 parts by weight of vinyl acetate.

Thereafter, an oxidation-reduction initiator, vinyl acetate, and a third solution including water, a NaOH solution, a functional monomer, and a second emulsifier are introduced into the product obtained in step S130 (hereinafter, referred to as 'step S140').

When the internal temperature of the reactor is stabilized, the polymerization between vinyl acetate and ethylene is initiated by adding the oxidation-reduction initiator to the product in the reactor obtained in step S130.

The oxidation-reduction initiator includes an oxidation initiator and a reduction initiator. (a) the oxidation initiator is selected from the group consisting of hydrogen peroxide, tri-butyl hydroperoxide, tert-butyl hydroperoxide, sodium persulfate, sodium carbonate, cumyl hydroperoxide, benzoyl peroxide, and a mixture thereof. (b) the reduction initiator is selected from the group consisting of a transition metal salt; and erythorbic acid, ascorbic acid, sodium erythorborate, an alkali metal salt thereof, and a mixture thereof.

The oxidation initiator and the reduction initiator respectively may be dissolved in water and added in a solution state. In this case, the content of the oxidation initiator in the oxidation initiator-containing solution may be 0.001 to 2 parts by weight based on 100 parts by weight of vinyl acetate, for example, in the case of tert-butyl hydroxide. The content of the reduction initiator in the reduction initiator-containing solution may be 0.001 to 1.0 wt % based on 100 parts by weight of vinyl acetate, for example, in the case of sodium erythorborate. The content of water in each solution is not particularly limited, and may be, for example, 10 times to 20 times as compared to the amount of oxidation initiator used and 25 times to 35 times as compared to the amount of reduction initiator used. According to an example, when the oxidation initiator and the reduction initiator are each introduced into a reactor at about 70 g/h to about 90 g/h, and the reaction temperature is increased by about 0.5° C. to about 1.5° C., preferably about 1° C., it is considered that the reaction is initiated, and from this time, the oxidation initiator and the reduction initiator are each introduced for about 100 minutes to about 140 minutes, preferably about 115 minutes to about 130 minutes.

Thereafter, vinyl acetate is introduced into the reactor. The reaction yield may be improved by introducing the vinyl acetate.

Vinyl acetate is introduced into the reactor for about 80 minutes to about 100 minutes after about 1 minute to about 3 minutes from the initiation of polymerization. In this case, the introduction rate may be about 5 g/min to about 7 g/min.

Subsequently, a third solution including water, a NaOH solution, a functional monomer, and a second emulsifier is introduced into the reactor. In this case, the third solution is introduced at a speed of about 10 g/min to about 14 g/min for about 90 minutes.

The third solution is formed by uniformly mixing water, the NaOH solution, the functional monomer, and the second emulsifier.

Examples of the functional monomer available in the present invention include a silane-based monomer, and are not limited thereto. Non-limiting examples thereof include vinyltrimethoxysilane, tetramethoxysilane, tetraethoxysilane, methyltrimethoxysilane, methyltriethoxysilane, and these compounds may be used alone or in a combination of two or more.

The content of the functional monomer is not particularly limited. But for example, in the case of a silane-based monomer, the content may be 0.1 to 10 parts by weight based on 100 parts by weight of vinyl acetate.

The concentration of a caustic soda solution (NaOH solution) is not particularly limited, but may be about 40% to about 60%.

Examples of the second emulsifier include a non-ionic emulsifier, an anionic emulsifier, and a reactive emulsifier. These emulsifiers may be used alone or in a combination of two or more. Examples thereof include: a non-ionic emulsifier such as a polyoxyethylene-polyoxypropylene block copolymer; an anionic emulsifier such as a phosphate-based compound (for example, poly(oxy-1,2-ethanediyl), alpha-tridecyl-omega-hydroxy-, phosphate); a reactive emulsifier such as 2-acrylamido-2-methylpropanesulfonic acid sodium salt, but are not limited thereto.

The content of the second emulsifier is not particularly limited. But for example, in the case of polyoxyethylene-polyoxypropylene, the content may be 0.1 to 35 parts by weight based on 100 parts by weight of vinyl acetate.

Here, when a mixture of a non-ionic emulsifier, an anionic emulsifier, and a reactive emulsifier is used as the second emulsifier, the ratio of non-ionic emulsifier, anionic emulsifier, and reactive emulsifier used may be a weight ratio of 1:0.03 to 50:0.03 to 50. By using the emulsifiers, the storage stability and physical properties of the vinyl acetate-ethylene copolymer emulsion may be improved as compared to the case where the emulsifiers are each used alone.

The content of water in the third solution is not particularly limited, and may be, for example, 10 times to 15 times as compared to the amount of functional monomer used.

The mixing time of water, the functional monomer, the NaOH solution, and the second emulsifier is not particularly limited, but when the time is within a range of about 10 minutes to about 30 minutes, preferably 15 minutes to 25 minutes, the materials may be more uniformly mixed.

It is preferred to adjust the pH of the third solution produced as described above to about 3.7 to about 4.3. When the pH of the third solution is within such range, the yield of the subsequent polymerization may be improved.

Thereafter, after the polymerization was completed, a first mixed solution including the vinyl acetate-ethylene copolymer was obtained by simultaneously adding an oxidizing agent and a second reducing agent into the reactor (hereinafter, referred to as 'step S150').

Step S150is for additionally removing vinyl acetate, that is a residual monomer. For this purpose, in this step, solutions obtained by dissolving the oxidizing agent and the second reducing agent in water are simultaneously added to the reactor for the same period of time.

Non-limiting examples of the oxidizing agent include tert-butyl hydroperoxide, hydrogen peroxide, tri-butyl hydroperoxide, cumyl hydroperoxide, and benzoyl peroxide, and these compounds may be used alone or in a combination of two or more.

Further, non-limiting examples of the second reducing agent include sodium erythorborate, sodium formaldehyde sulfoxylate, and sodium hydrosulfite, but are not limited thereto. These compounds may be used alone or in a combination of two or more thereof.

The oxidizing agent and the second reducing agent may be each dissolved in water and added in a solution state. In this case, the content of the oxidizing agent in the oxidizing agent-containing solution may be 0.001 to 2 parts by weight based on 100 parts by weight of vinyl acetate, for example, in the case of tert-butyl hydroxide. The content of the second reducing agent in the second reducing agent-containing solution may be 0.001 to 2 parts by weight based on 100 parts by weight of vinyl acetate, for example, in the case of sodium erythorborate. The content of water in each solution is not particularly limited, and may be, for example, about 1 time to about 10 times as compared to the amount of oxidizing agent used and about 10 times to about 15 times as compared to the amount of second reducing agent used.

The first mixed solution obtained in step S150 contains a vinyl acetate-ethylene copolymer, and may contain one or more functional monomers, various emulsifiers, residual initiators, and unreacted monomers. The content of the vinyl acetate-ethylene copolymer in the first mixed solution is not particularly limited, but may be 45 wt % to 70 wt % based on the total weight of the solid content in the first mixed solution.

Meanwhile, according to a second exemplary embodiment, step S100 includes: (S101) preparing a first solution including water, a first emulsifier, and a pH adjusting agent; (S102) introducing vinyl acetate and ethylene into the first solution under a nitrogen atmosphere; (S103) introducing a first reducing agent into a product obtained in step S102, and then warming the resulting mixture to 45° C. to 65° C.; (S104) introducing a thermal initiator, vinyl acetate, and a third solution including water, NaOH, a functional monomer, and a second emulsifier into a product obtained in step S103; and (S105) completing a polymerization, and then simultaneously introducing an oxidizing agent and a second reducing agent.

When the first mixed solution is formed according to the second exemplary embodiment, the steps other than step S101 and step S104 are the same as those of the above-described first exemplary embodiment.

Specifically, step S101 only prepares a first solution of water, a first emulsifier, and a pH adjusting agent, and does not mix the first solution with a second solution of water and an oxidation catalyst, different from the above-described step S110. In this case, the conditions such as the component, content, and pH of the first solution are the same as those mentioned in step S10.

Further, step S104 uses a thermal initiator instead of the oxidation-reduction initiator, different from the above-described step S140.

Examples of the thermal initiator include potassium persulfate, ammonium persulfate, and sodium persulfate, and these compounds may be used alone or in a combination of two or more.

The content of the thermal initiator is not particularly limited, but may be within a range of 0.001 to 2 parts by weight based on 100 parts by weight of vinyl acetate.

(S200) Addition of KIO$_3$

Thereafter, a second mixed solution is formed by adding potassium iodate (KIO$_3$) to the first mixed solution obtained in step S100 (hereinafter, referred to as 'step S200').

However, in the present invention, it is preferred to add KIO$_3$ 30 after minutes to 2 hours from the formation of the first mixed solution. By doing this, KIO$_3$ may efficiently oxidize the residual initiator, thereby promoting the reaction of the residual monomer to remove the residual monomer and more effectively preventing the isothiazolone-based compound from decomposing. Accordingly, the product stability and yield of the vinyl acetate-ethylene copolymer emulsion produced according to the present invention may be improved.

More preferably, the KIO$_3$ may be added after 45 minutes to 1.5 hours from the formation of the first mixed solution, and in this case, the amount of residual monomer, particularly, the remaining amount of vinyl acetate may be further minimized. According to an example, KIO$_3$ is added after 1 hour from the formation of the first mixed solution.

It is appropriate to adjust the content of the KIO$_3$ according to the content of the isothiazolone-based compound, and the like. However, when the content of the KIO$_3$ is preferably about 10 ppm to about 200 ppm, more preferably about 50 ppm to about 150 ppm, and most preferably about 80 ppm to about 120 ppm, the stability of the VAE emulsion may be further improved by minimizing the amount of aggregates (grit) generated in the final VAE emulsion.

(S300) Addition of Isothiazolone-Based Compound

Subsequently, the VAE emulsion is obtained by adding an isothiazolone-based compound to the second mixed solution obtained in step S200(hereinafter, referred to as 'step S300').

The isothiazolone-based compound has a preservative effect. Since compound may be stably maintained without being decomposed by KIO$_3$ added in step S200, the stability of the VAE emulsion may be improved.

Examples of the isothiazolone-based compound include 5-chloro-2-methyl-4-isothiazolin-3-one (CMIT), 2-methyl-4-isothiazolin-3-one (MIT), and 1,2-benzisothiazolin-3-one (BIT), but are not limited thereto. These compounds may be used alone or in a combination of two or more.

The content of the isothiazolone-based compound is not particularly limited, but when the content is within a range of preferably 10 ppm to 150 ppm, and more preferably 30 ppm to 120 ppm based on the total weight of the vinyl acetate-ethylene copolymer emulsion (preferably the total weight of the solid content in the emulsion), the decay of the VAE emulsion may be more effectively prevented.

Meanwhile, in the present invention, in addition to the isothiazolone-based compound, as additives which may be added to an aqueous emulsion, if necessary, either one or two or more of various additives, such as an antifoaming agent, a cationic inorganic pigment, a thickener, a plasticizer, and a dispersant known in the art, may be further added.

The antifoaming agent may be used without particular limitation as long as the antifoaming agent is known in the art. Examples thereof include silicone-based antifoaming agents, alcohol-based antifoaming agents, polyether-based antifoaming agents, mineral oil-based antifoaming agents, modified silicone-based antifoaming agents, emulsion-based antifoaming agents, and silica silicone-based antifoaming agents.

Examples of the cationic inorganic pigment include calcium carbonate, carbon black, clay, titanium dioxide, cement, and silica sand, but are not limited thereto.

Non-limiting examples of the thickener include acrylic thickeners.

Non-limiting examples of the plasticizer include dimethyl phthalate (DMP), dibutyl phthalate (DBP), di-isobutyl phthalate (DIBP), dihexyl phthalate (DHP), dioctyl phthalate (DOP), di-iso-octyl phthalate (DIOP) dinonyl phthalate (DNP), di-isodecyl phthalate (DIDP), and benzyl butyl phthalate (BBP), and these compounds may be used alone or in a combination of two or more.

Non-limiting examples of the dispersant include polycarboxylic acid-based compounds, polyester-based compounds, polycarboxylic acid ester-based compounds, unsaturated polyamide-based compounds, polycarboxylic acid alkyl salt compounds, polyacrylic compounds, polyethyleneimine-based compounds, and polyurethane-based compounds, and these compounds may be used alone or in a combination of two or more.

The contents of the various additives as described above are not particularly limited and appropriately adjusted according to the type of additive, and may be about 0.01 wt % to about 10 wt %, preferably about 0.01 wt % to about 5 wt %, for example, based on the total weight of the vinyl acetate-ethylene copolymer emulsion.

Meanwhile, the present invention provides a vinyl acetate-ethylene copolymer emulsion including: a vinyl acetate-ethylene copolymer; an isothiazolone-based compound; and potassium iodate (KIO$_3$).

The vinyl acetate-ethylene copolymer emulsion may be produced by a method known in the art. However, as described above, in the present invention, KIO$_3$ is added at a particular time point in the production of the vinyl acetate-ethylene copolymer emulsion, which differs from the conventional method. This is because the residual amount of vinyl acetate varies according to the time point of adding KIO$_3$, and as a result, the quality and yield of the product are affected. Accordingly, the vinyl acetate-ethylene copolymer emulsion of the present invention, which is produced by adding KIO$_3$ after 30 minutes to 2 hours from the completion of the polymerization of the vinyl acetate-ethylene copolymer (preferably, after removal of unreacted monomers from the polymerization reaction), before adding the isothiazolone-based compound is better in terms of quality and yield than the conventional emulsions not including KIO$_3$ and the other emulsions having different KIO$_3$ addition time point.

The vinyl acetate-ethylene copolymer emulsion may further include an antifoaming agent, a cationic inorganic pigment, a thickener, a plasticizer, a dispersant, and a mixture thereof, if necessary. The contents thereof are the same as those described above.

Hereinafter, the present invention will be described in detail through the Examples, but the following Examples and Experimental Examples only exemplify one form of the present invention, and the scope of the present invention is not limited by the following Examples and Experimental Examples.

Example 1—Production of Vinyl Acetate-Ethylene Copolymer Emulsion 3,661.5 g of process water was introduced into a first vessel, and then 35.3 g of sodium sulfosuccinate alkyl glycol as a first emulsifier, 2.1 g of sodium acetate as a pH adjusting agent, and 2.2 g of acetic acid were introduced thereinto, and the resulting mixture was stirred for 20 minutes, thereby obtaining a first solution (pH 4.2). 3.3 g of process water was introduced into a second vessel, and then 0.2 g of ferrous ammonium sulfate was added thereto and completely dissolved, thereby obtaining a second solution. Thereafter, after the first solution and the second solution were mixed, the resulting mixture was stirred for 10 minutes, and then was introduced into a pressurized reactor (internal pressure: 80 kgf/cm$^2$). Thereafter, the inside of the pressurized reactor was sufficiently substituted with a nitrogen atmosphere, and then, 1,049 g of a vinyl acetate monomer was introduced into the pressurized reactor, and then 1,048 g of an ethylene gas was introduced thereinto, and the resulting mixture was stirred for about 20 minutes.

Meanwhile, as a separate process, 117.6 g of a polyoxyethylene polyoxypropylene block copolymer as a non-ionic emulsifier, 77.7 g of a phosphate-based anionic emulsifier (poly(oxy-1,2-ethanediyl), alpha-tridecyl-omega-hydroxy-, phosphate), 20 g of a 50% caustic soda solution, 77 g of 2-acrylamido-2-methylpropanesulfonic acid sodium salt as a reactive emulsifier, and 66.2 g of vinyltriethoxysilane as a silane-based monomer were introduced into a beaker containing 870 g of process water, and then the resulting mixture was stirred for about 20 minutes, thereby preparing a third solution (pH 4.3).

Further, as a separate process, an oxidation-reduction initiator was prepared. Specifically, an oxidation initiator was prepared by adding and completely dissolving 17 g of sodium persulfate and 2 g of sodium carbonate in 281.6 g of process water, and then a reduction initiator was prepared by adding and dissolving 11.3 g of sodium erythorborate in 331.9 g of process water.

Thereafter, 11 g of sodium erythorborate was introduced into the pressurized reactor. Subsequently, the temperature of the pressurized reactor was increased to 55° C., and then when the temperature inside the pressurized reactor was stabilized, the oxidation initiator and the reduction initiator, which were prepared, were introduced thereinto. In this case, the oxidation initiator was introduced at a rate of about 80 g/hour, and when the reaction temperature inside the reactor was increased by about 1° C., it was considered that the polymerization was initiated, and from the time point, the oxidation initiator and the reduction initiator were introduced thereinto for about 120 minutes. After about 2 minutes from the initiation of the polymerization, vinyl acetate was additionally introduced at a rate of about 6.2 g/min for about 90 minutes. Further, the third solution prepared in advance was introduced thereinto for about 90 minutes (introduction rate: about 12 g/min).

After the reaction was completed, in order to remove (reduce) the residual vinyl acetate, a solution obtained by dissolving 14 g of tert-butyl hydroperoxide in 72.3 g of process water was introduced into the pressurized reactor for 15 minutes, and simultaneously, a solution obtained by dissolving 7.6 g of sodium erythorborate in 92.4 g of process water was added thereto for the same period of time, thereby obtaining a first mixed solution including a vinyl acetate-ethylene copolymer.

Thereafter, 1 hour later, a second mixed solution was obtained by adding 100 ppm of potassium iodate (KIO$_3$) to the first mixed solution. Subsequently, a final vinyl acetate-ethylene copolymer emulsion was produced by introducing 100 ppm of 5-chloro-2-methyl-4-isothiazolin-3-one (CMIT) and 0.01 wt % (based on the total weight of the VAE emulsion) of polysiloxane being an antifoaming agent into the second mixed solution.

Example 2

A vinyl acetate-ethylene copolymer emulsion was produced in the same manner as in Example 1, except that KIO$_3$ was used in an amount of 50 ppm instead of 100 ppm.

Example 3

A vinyl acetate-ethylene copolymer emulsion was produced in the same manner as in Example 1, except that KIO$_3$ was used in an amount of 75 ppm instead of 100 ppm.

Example 4

A vinyl acetate-ethylene copolymer emulsion was produced in the same manner as in Example L, except that KIO$_3$ was used in an amount of 150 ppm instead of 100 ppm.

Example 5

A vinyl acetate-ethylene copolymer emulsion was produced in the same manner as in Example 1, except that CMIT was used in an amount of 50 ppm instead of 100 ppm.

Example 6

A vinyl acetate-ethylene copolymer emulsion was produced in the same manner as in Example 1, except that 2-methyl-4-isothiazolin-3-one (MIT) was used in an amount of 150 ppm instead of 100 ppm of CMIT used in Example 1.

Comparative Example 1

A vinyl acetate-ethylene copolymer emulsion was produced in the same manner as in Example 1, except that KIO$_3$ was not added.

Comparative Example 2

A vinyl acetate-ethylene copolymer emulsion was produced in the same manner as in Example 1, except that 100 ppm of $KIO_3$ was added before the introduction of the oxidation initiator and the reduction initiator into the pressurized reactor, instead of adding 100 ppm of $KIO_3$ after 1 hour from the synthesis of the first mixed solution including the vinyl acetate-ethylene copolymer.

Comparative Example 3

A vinyl acetate-ethylene copolymer emulsion was produced in the same manner as in Example 1, except that 100 ppm of $KIO_3$ was added immediately after the synthesis of the first mixed solution, instead of adding 100 ppm of $KIO_3$ after 1 hour from the synthesis of the first mixed solution including the vinyl acetate-ethylene copolymer.

Comparative Example 4

A vinyl acetate-ethylene copolymer emulsion was produced in the same manner as in Example 1, except that 100 ppm of $KIO_3$ was added after addition of the CMIT, instead of adding 100 ppm of $KIO_3$ after 1 hour from the synthesis of the first mixed solution including the vinyl acetate-ethylene copolymer was synthesized.

Comparative Example 5

A vinyl acetate-ethylene copolymer emulsion was produced in the same manner as in Example 5, except that $NaIO_3$ was used in an amount of 100 ppm instead of $KIO_3$.

Comparative Example 6

A vinyl acetate-ethylene copolymer emulsion was produced in the same manner as in Example 5, except that $Cu(NO_3)_2$ was used in an amount of 100 ppm instead of $KIO_3$.

Comparative Example 7

A vinyl acetate-ethylene copolymer emulsion was produced in the same manner as in Example 6, except that $NaIO_3$ was used in an amount of 100 ppm instead of $KIO_3$.

Comparative Example 8

A vinyl acetate-ethylene copolymer emulsion was produced in the same manner as in Example 6, except that $Cu(NO_3)_2$ was used in an amount of 100 ppm instead of $KIO_3$.

Comparative Example 9

A vinyl acetate-ethylene copolymer emulsion was produced in the same manner as in Example 6, except that $KIO_3$ was not used.

Experimental Example 1—Measurement of Amount of Vinyl Acetate Remaining According to Time Point of Adding $KIO_3$ 5 g of the vinyl acetate-ethylene copolymer emulsion in Example 1 was placed into a vial for GC measurement, 30 g of a standard sample at a known concentration was added thereto, and then the resulting mixture was uniformly mixed. The Headspace GC of the mixture was analyzed by using a Restek Rtx 1701 capillary column. In this case, for the initial start of the oven, the oven was left to stand at 40° C. for 3 minutes, and then was warmed at a rate of 8° C./min up to a temperature of 260° C. In this case, the vinyl acetate-ethylene copolymer emulsions in Comparative Examples 1 to 4 were used as a control group.

TABLE 1

|  | Example 1 | Comparative Example 1 | Comparative Example 2 | Comparative Example 3 | Comparative Example 4 |
|---|---|---|---|---|---|
| Concentration (ppm) of $KIO_3$ | 100 | — | 100 | 100 | 100 |
| Time point of adding $KIO_3$ | Before adding CMIT 1 hour after synthesizing first mixed solution | — | Before introducing oxidation-reduction initiator into pressurized reactor | Immediately after synthesizing first mixed solution | After adding CMIT |
| Amount (ppm) of vinyl acetate remaining | 15,950 | 22,300 | 18,650 | 16,200 | 16,350 |

As a result of the experiments, it could be confirmed that the vinyl acetate-ethylene copolymer emulsion in Example 1, in which $KIO_3$ was added before CMIT was added after 1 hour from the synthesis of the first mixed solution, had the smallest residual amount of vinyl acetate in the emulsion as compared to that of the vinyl acetate-ethylene copolymer emulsions in Comparative Examples 1 to 4.

Experimental Example 2 Measurement of Amount of Aggregates Generated in Final Emulsion According to Amount of $KIO_3$ Added A 325 mesh-steel filtration mesh was cut into a size of 10 cm×10 cm, and then the weight ($W_1$) of the filtration mesh was exactly measured. Thereafter, 500 g of each of the vinyl acetate-ethylene copolymer emulsions obtained in Examples 1 to 4 and Comparative Example 1 was diluted and filtered by the 325 mesh-steel filtration mesh, the filtration mesh was dried in a dryer at 135° C. for 1 hour, and then the weight ($W_2$) of the filtration mesh was measured. Thereafter, the difference in weight between $W_2$ and W was defined as an amount (ppm) of aggregates generated in the emulsion, and is shown in the following Table 2.

TABLE 2

|  | Example 1 | Example 2 | Example 3 | Example 4 | Comparative Example 1 |
|---|---|---|---|---|---|
| Concentration (ppm) of $KIO_3$ | 100 | 50 | 75 | 150 | — |
| Amount of aggregates generated (325 mesh, ppm) | 29 | 35 | 27 | 32 | 43 |

As a result of the experiments, it could be confirmed that the vinyl acetate-ethylene copolymer emulsions in Examples 1 to 4 in which $KIO_3$ was added had a smaller amount of aggregates generated in the final emulsion than that of the vinyl acetate-ethylene copolymer emulsion in Comparative Example 1 in which $KIO_3$ was not added.

Experimental Example 3—Measurement of Stability of Various Additives According to Amount of $KIO_3$ Added In order to measure the stability of the vinyl acetate-ethylene copolymer emulsion according to the present invention for various organic-inorganic-based additives, the following experiments were performed.

Various additives described in Table 3 were added to the vinyl acetate-ethylene copolymer emulsion each obtained in Examples 1, 3, and 4 and Comparative Example 1, and then the resulting mixture was stirred for 30 minutes. In this case, cement, calcium carbonate, and clay, which are inorganic-based additives, were added in an amount which was 3 times the weight of the emulsion, and a polycarboxylic acid-based dispersant and an acrylic thickener, which are organic-based additives, were added in an amount of 10 parts by weight based on 100 parts by weight of the emulsion. Thereafter, after a 325 mesh-steel filtration mesh was cut into a size of 10 cm×10 cm, the weight ($W_1$) of the filtration mesh was exactly measured, and then 500 g of the vinyl acetate-ethylene copolymer emulsion to which the additives were added was diluted and filtered by the 325 mesh-steel filtration mesh, the filtration mesh was dried in a dryer at 130° C. for 1 hour, and then the weight ($W_2$) of the filtration mesh was measured. Thereafter, the difference in weight between $W_2$ and $W_1$ was defined as an amount (ppm) of aggregates generated in the emulsion, and is shown in the following Table 3.

aggregates of various additives, such as cement and calcium carbonate, than that of the vinyl acetate-ethylene copolymer emulsion in Comparative Example 1 in which $KIO_3$ was not added. In particular, in the case of Examples 1 and 3 in which $KIO_3$ was added in an amount of 50 to 100 ppm, it could be certained that various additives could be more effectively and stably present.

Therefore, when $KIO_3$ is added during the preparation of the vinyl acetate-ethylene copolymer emulsion, extra initiators, residual monomers, and the like, which may cause a problem with compatibility with various additives, may be removed by $KIO_3$. Thus, it could be indirectly seen that the emulsion prepared according to the present invention can have stability for various additives.

Experimental Example 4—Measurement of Durability of CMIT and MIT According to Addition of $KIO_3$ Each of the vinyl acetate-ethylene copolymer emulsions obtained in Examples 5 and 6 and Comparative Examples 1 and 5 to 9 was four-fold diluted with an acrylonitrile solvent, and then was centrifuged at a speed of 13,000 rpm for 3 minutes, thereby obtaining a first supernatant. Thereafter, the first supernatant was 5-fold diluted with deionized water, and then was centrifuged again at a speed of 13,000 rpm for 3 minutes, and then a second supernatant obtained in this case were analyzed by using a liquid chromatography. Meanwhile, a preservative at a concentration, which was the same as the initial concentration of CMIT and MIT described in Tables 5 and 6, was diluted, and then the diluted solution was 4-fold diluted with ACN and 5-fold diluted with deionized water, and the resulting diluted solution was used as a standard solution. In this case, liquid chromatography (HPLC) analysis conditions of each of the preserva-

TABLE 3

|  | Example 1 | Example 3 | Example 4 | Comparative Example 1 |
|---|---|---|---|---|
| Concentration (ppm) of $KIO_3$ | 100 | 50 | 150 | — |
| Amount (ppm) of aggregates generated when cement is added | 175 | 187 | 165 | 230 |
| Amount (ppm) of aggregates generated when calcium carbonate is added | 75 | 85 | 75 | 97 |
| Amount (ppm) of aggregates generated when clay is added | 30 | 42 | 41 | 61 |
| Amount (ppm) of aggregates generated when polycarboxylic acid-based dispersant is added | 80 | 103 | 86 | 135 |
| Amount (ppm) of aggregates generated when acrylic thickener is added | 27 | 25 | 31 | 57 |

As a result of the experiments, it could be seen that the vinyl acetate-ethylene copolymer emulsions in Examples 1, 3, and 4 in which $KIO_3$ was added had a smaller amount of tives in the emulsions are shown in the following Table 4. The measurement results are shown in the following Tables 5 and 6.

TABLE 4

| Analysis component | MIT/CMIT |
|---|---|
| Column | C18 |
| Mobile Phase | ACN:H$_2$O = 1:9 (500 ppm of H$_3$PO$_4$) |
| Detection | UV 280 nm(MIT/CMIT) Dual |
| Flow Rate | 1.0 ml/min |
| Run time | 20 min |

TABLE 5

| | | Example 5 | Comparative Example 1 | Comparative Example 5 | Comparative Example 6 |
|---|---|---|---|---|---|
| Type of oxidation initiator | | KIO$_3$ | — | NaIO$_3$ | Cu(NO$_3$)$_2$ |
| Concentration (ppm) of oxidation initiator | | 100 | — | 100 | 100 |
| Initial concentration (ppm/ppm) of CMIT | | 50 | 50 | 50 | 50 |
| Concentration (ppm/ppm) of CMIT after being stored at 65° C. | 1 day later | 49 | 40 | 45 | 46 |
| | 2 days later | 47 | 37 | 42 | 39 |
| | 3 days later | 42 | 29 | 39 | 37 |
| | 6 days later | 42 | 15 | 35 | 31 |

TABLE 6

| | | Example 6 | Comparative Example 7 | Comparative Example 8 | Comparative Example 9 |
|---|---|---|---|---|---|
| Type of oxidation initiator | | KIO$_3$ | NaIO$_3$ | Cu(NO$_3$)$_2$ | — |
| Concentration (ppm) of oxidation initiator | | 100 | 100 | 100 | — |
| Initial concentration (ppm/ppm) of MIT | | 150 | 150 | 150 | 150 |
| Concentration (ppm/ppm) of MIT after being stored at 65° C. | 1 day later | 147 | 145 | 143 | 135 |
| | 2 days later | 145 | 141 | 131 | 121 |
| | 3 days later | 137 | 139 | 126 | 108 |
| | 6 days later | 135 | 128 | 120 | 87 |

As a result of the experiments, in the case of Examples 5 and 6 in which KIO$_3$ was added, CMIT and MIT were stably maintained as compared to the case of Comparative Examples 1 and 9 in which KIO$_3$ was not added or Comparative Examples 5 to 8 in which NaIO$_3$ or Cu(NO$_3$)$_2$ was added (see Tables 5 and 6).

From the results, it could be seen that since the decomposition of the isothiazolone-based compound is prevented by KIO$_3$ in the vinyl acetate-ethylene copolymer emulsion produced according to the present invention, the isothiazolone-based compound in the emulsion can be stably maintained for long time, and accordingly, the vinyl acetate-ethylene copolymer emulsion can be stably stored for long time.

The invention claimed is:

1. A method for producing a vinyl acetate-ethylene copolymer emulsion, the method comprising:

(S100) forming a first mixed solution containing a vinyl acetate-ethylene copolymer, comprising polymerizing vinyl acetate and ethylene;

(S200) forming a second mixed solution by adding potassium iodate (KIO$_3$) to the first mixed solution, wherein potassium iodate (KIO$_3$) is added after 30 minutes to 2 hours from the formation of the first mixed solution in step S100; and (S300) adding an isothiazolone-based compound to the second mixed solution.

2. The method of claim 1, wherein in step S200, potassium iodate (KIO$_3$) is added after 45 minutes to 1 hour and 30 minutes from the formation of the first mixed solution in step S100.

3. The method of claim 1, wherein in step S200, KIO$_3$ is added in an amount of 10 to 200 ppm based on a total amount of the first mixed solution.

4. The method of claim 3, wherein in step S200, KIO$_3$ is added in an amount of 50 to 150 ppm based on the total amount of the first mixed solution.

5. The method of claim 1, wherein in step S300, the isothiazolone-based compound is added in an amount of 10 to 150 ppm based on a total amount of the vinyl acetate-ethylene copolymer emulsion.

6. The method of claim 1, wherein step S100 comprises:
(S110) mixing a first solution comprising water, a first emulsifier, and a pH adjusting agent with a second solution comprising water and an oxidation auxiliary agent;
(S120) Introducing vinyl acetate and ethylene into the mixture obtained in step S110 under a nitrogen atmosphere;
(S130) Introducing a first reducing agent into a product obtained in step S120, and then warming the resulting mixture to 45° C. to 65° C.;
(S140) introducing an oxidation-reduction initiator, vinyl acetate, and a third solution including water, a NaOH solution, a functional monomer, and a second emulsifier into a product obtained in step S130;and
(S150) completing a polymerization, and then simultaneously introducing an oxidizing agent and a second reducing agent into the product obtained in step S140.

7. The method of claim 1, wherein step S100 comprises:
(S101) preparing a first solution comprising water, a first emulsifier, and a pH adjusting agent;
(S102) introducing vinyl acetate and ethylene into the first solution under a nitrogen atmosphere;
(S103) Introducing a first reducing agent into a product obtained in step S102,and then warming the resulting mixture to 45° C. to 65° C.;
(S104) Introducing a thermal initiator; vinyl acetate; and a third solution including water, NaOH, a functional monomer, and a second emulsifier into a product obtained in step S103; and
(S105) completing a polymerization reaction, and then simultaneously introducing an oxidizing agent and a second reducing agent.

8. The method of claim 6, wherein the first emulsifier is a sulfonate group-containing emulsifier.

9. The method of claim 6, wherein the oxidation-reduction initiator comprises:
(a) one or more reduction initiators selected from the group consisting of a transition metal salt; and erythorbic acid, ascorbic acid, and an alkali metal salt thereof and
(b) one or more oxidation initiators selected from the group consisting of hydrogen peroxide, tri-butyl hydroperoxide, tert-butyl hydroperoxide, cumyl hydroperoxide, and benzoyl peroxide.

10. A vinyl acetate-ethylene copolymer emulsion comprising:
a vinyl acetate-ethylene copolymer;
an isothiazolone-based compound; and
potassium iodate ($KIO_3$).

11. The vinyl acetate-ethylene copolymer emulsion of claim 10, further comprising:
one or more additives selected from the group consisting of an antifoaming agent, a cationic inorganic pigment, a thickener, a plasticizer, and a dispersant.

12. The method of claim 7, wherein the first emulsifier is a sulfonate group-containing emulsifier.

* * * * *